United States Patent
Glenn, III et al.

(10) Patent No.: US 10,465,711 B2
(45) Date of Patent: Nov. 5, 2019

(54) APPARATUS AND METHODS TO DEPLOY A FLUID FLOW CHANNEL

(71) Applicant: The Boeing Company, Chicago, IL (US)

(72) Inventors: Richard J. Glenn, III, Lynnwood, WA (US); Steve G. Mackin, Bellevue, WA (US); Kyle J. Johnson, Seattle, WA (US); Austin J. Snider, Seattle, WA (US)

(73) Assignee: The Boeing Company, Chicago, IL (US)

( * ) Notice: Subject to any disclaimer, the term of this patent is extended or adjusted under 35 U.S.C. 154(b) by 432 days.

(21) Appl. No.: 15/296,857

(22) Filed: Oct. 18, 2016

(65) Prior Publication Data

US 2018/0106273 A1    Apr. 19, 2018

(51) Int. Cl.
F04D 29/54 (2006.01)
B64D 41/00 (2006.01)
F04D 29/52 (2006.01)
B64C 25/10 (2006.01)

(52) U.S. Cl.
CPC ............ *F04D 29/547* (2013.01); *B64C 25/10* (2013.01); *B64D 41/007* (2013.01); *F04D 29/522* (2013.01)

(58) Field of Classification Search
CPC ........ F04D 29/522; F04D 29/547; F03D 5/02; Y02E 10/70; B64D 33/02
See application file for complete search history.

(56) References Cited

U.S. PATENT DOCUMENTS

| | | | |
|---|---|---|---|
| 3,887,817 A | 6/1975 | Steelman | |
| 4,121,606 A * | 10/1978 | Holland | B64D 33/02 137/15.1 |
| 4,533,095 A * | 8/1985 | Yates | B64D 33/02 244/12.5 |
| 4,641,678 A | 2/1987 | Haas et al. | |
| 6,142,417 A * | 11/2000 | Figge, Sr. | B64D 33/02 137/15.1 |

(Continued)

FOREIGN PATENT DOCUMENTS

| | | |
|---|---|---|
| DE | 21614 C | 4/1883 |
| DE | 25332 C | 1/1884 |

(Continued)

OTHER PUBLICATIONS

European Patent Office, "Extended European Search Report," issued in connection with European Patent Application No. 17196906.6, dated Dec. 19, 2017, 8 pages.

(Continued)

*Primary Examiner* — Philip J Bonzell
*Assistant Examiner* — Tye William Abell
(74) *Attorney, Agent, or Firm* — Hanley, Flight & Zimmerman, LLC (57) ABSTRACT

Apparatus and methods to deploy a fluid flow channel are disclosed herein. An example apparatus includes a first loop coupled to an outside surface of a vehicle via a first fastener, a second loop coupled to the vehicle and disposed a distance from the first loop, and a flexible material having a first end coupled to the first loop and a second end coupled to the second loop, where the flexible material is to form a fluid flow channel between the first loop and the second loop.

17 Claims, 10 Drawing Sheets

(56) References Cited

U.S. PATENT DOCUMENTS

| | | |
|---|---|---|
| 9,452,721 B2 | 9/2016 | Mackin |
| 9,644,605 B2 | 5/2017 | Mackin et al. |
| 2003/0066934 A1 | 4/2003 | Bolonkin |
| 2006/0102781 A1 | 5/2006 | Hein et al. |
| 2008/0303285 A1 | 12/2008 | Bondhus |
| 2009/0212594 A1* | 8/2009 | Breidenbach ........ B62D 35/001 296/180.1 |
| 2013/0248657 A1* | 9/2013 | Riordan ............... B64D 41/007 244/53 B |
| 2015/0091375 A1 | 4/2015 | Mackin |
| 2016/0160841 A1* | 6/2016 | Mackin .................... F03D 5/02 290/55 |
| 2016/0186717 A1* | 6/2016 | Santos ..................... F03B 5/00 60/716 |
| 2016/0305247 A1* | 10/2016 | Freda ........................ F03D 5/00 |
| 2018/0093779 A1* | 4/2018 | Ainslie .................. B64D 33/02 |

FOREIGN PATENT DOCUMENTS

| | | | |
|---|---|---|---|
| EP | 1878916 A1 | 1/2008 | |
| FR | 2736101 A1 | 1/1997 | |
| FR | 2970525 A1 | 7/2012 | |
| GB | 2480454 | 11/2011 | |
| GB | 2480454 A * | 11/2011 | ............... G09F 7/12 |
| WO | 2012067533 A1 | 5/2012 | |
| WO | 2012098314 A1 | 7/2012 | |

OTHER PUBLICATIONS

European Patent Office, European Search Report, in connection with EP Application Serial No. EP 14187318, dated Feb. 12, 2015, 2 pages.

European Patent Office, "Communication Pursuant to Article 94(3) EPC", issued in connection with European Patent Application No. 17196906.6 dated Feb. 4, 2019, 4 pages.

* cited by examiner

APPARATUS AND METHODS TO DEPLOY A FLUID FLOW CHANNEL

FIELD OF THE DISCLOSURE

This disclosure relates generally to fluid flow channels and, more particularly, to apparatus and methods to deploy a fluid flow channel.

BACKGROUND

In some situations, a vehicle, such as an aircraft, may lose power during operation. Upon loss of power, an emergency power generator may be deployed to generate power. The design of the emergency power generator may vary based on the type of vehicle with which the emergency power generator is implemented. For example, ram air turbines may be used with some types of aircraft. In some examples, the ram air turbine may be implemented with a nozzle to concentrate and increase a velocity of the air flow toward the ram air turbine, thus increasing the power generated by the ram air turbine.

SUMMARY

An example apparatus includes a first loop coupled to an outside surface of a vehicle via a first fastener, a second loop coupled to the vehicle and disposed a distance from the first loop, and a flexible material having a first end coupled to the first loop and a second end coupled to the second loop, where the flexible material is to form a fluid flow channel between the first loop and the second loop.

An example method includes deploying a first loop adjacent to a surface on a vehicle deploying a second loop adjacent to the surface on the vehicle, the second loop to be deployed in a first position, wherein the second loop is to move to a second position after deployment.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

The example apparatus described herein may be implemented with an emergency power generator of a vehicle (e.g., an air turbine) to increase the power output of the emergency power generator. The example apparatus may be operative to channel a flow of a fluid toward the emergency power generator and/or increase a velocity of the flow of the fluid. The example apparatus described herein may be a deployable nozzle including a first loop coupled to an outside surface of a vehicle via a first fastener, a second loop coupled to the vehicle and disposed a distance from the first loop, and a flexible material having a first end coupled to the first loop and a second end coupled to the second loop. The flexible material forms a fluid flow channel between the first loop and the second loop. The flexible material may include nylon, silk, synthetic fibers, or any combination thereof. The fluid flow channel is tapered to increase a velocity of a fluid flow between the first loop and the second loop. The first loop defines a first area and the second loop defines a second area smaller than the first area. The first loop may be deployed in response to an emergency condition.

The second loop may be coupled to the vehicle via a second fastener to enable the second loop to rotate relative to the vehicle. The first and second loops are stored in an interior of the vehicle prior to being deployed. The first and second loops rotate at different rates due to the difference in size between the first and second loops. In some examples, the rate of rotation of the second loop is based on a velocity of the fluid through the fluid flow channel. That is, after the first loop is deployed, the fluid flow may cause the second loop to rotate at a rate defined by the velocity of the fluid flow. The second loop may be disposed in a track and may translate within the track based on the flow of fluid through the fluid flow channel. One or more tension lines extending from the vehicle to the first loop prevent the first loop from rotating more than ninety degrees away from the vehicle. The fluid flow channel may be coupled, via the second loop, to an interior of the vehicle. In some examples, the fluid flow channel is directly coupled to the interior of the vehicle. In other examples, the fluid flow channel is coupled to the interior of the vehicle using an additional fluid flow channel.

Figure 1:
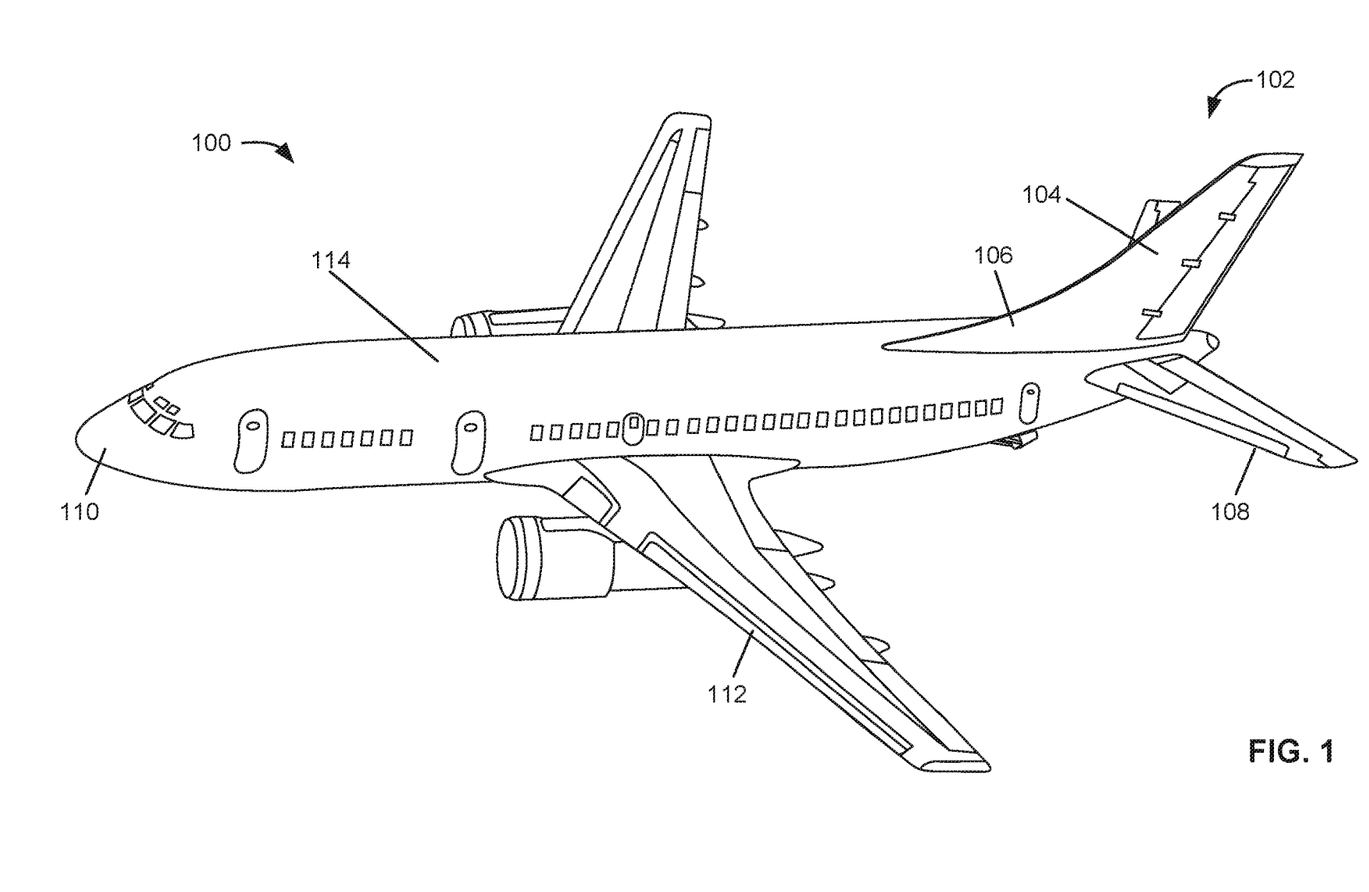
FIG. 1 represents an example environment in which the apparatus disclosed herein may be implemented.

FIG. 1 illustrates an example aircraft 100 with which the example apparatus disclosed herein may be implemented. The aircraft 100 of the illustrated example includes a tail section 102 including a vertical fin 104 adjacent to a dorsal fairing 106, horizontal stabilizers 108, a nose section (e.g., a cockpit section) 110 and wings 112 attached to a fuselage 114. The examples described herein may be applied to surfaces and/or features (e.g., riblets) of any of the tail section 102, the nose section 110, the stabilizers 108, the wings 112 and/or the fuselage 114, or any other exterior or outboard structure (e.g., a wing strut, an engine strut, a canard stabilizer, etc.) and/or surface.

Figure 2:
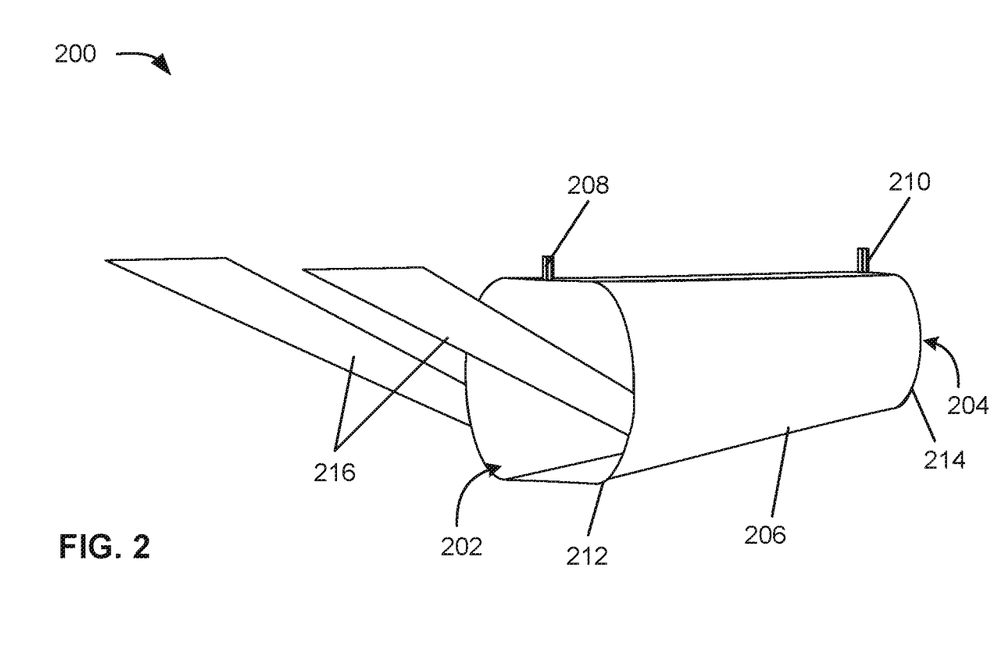
FIG. 2 is a diagram of an example apparatus that may be implemented on an aircraft.

FIG. 2 is a diagram of an example apparatus 200 that may be implemented on a vehicle, such as the aircraft 100. Alternatively, the example apparatus 200 may be implemented with other types of vehicles. The example apparatus 200 includes a first loop 202 and a second loop 204 defining a fluid flow channel 206. The first loop 202 of the example apparatus 200 is larger than the second loop 204. The first and second loops 202, 204 crate a tapered flow channel to increase the velocity of the fluid flow through the fluid flow channel 206. In some examples, the ratio of an area of the first loop 202 to an area of the second loop 204 is 2:1. Alternatively, the ratio may be different and/or the ratio may be variable. That is, the area of the first loop 202 and/or the second loop 204 may be changed during operation of the aircraft 100 based on, for example, a speed of the aircraft 100, a velocity of the airflow through the fluid flow channel 206, etc. In such examples, the first and second loops 202, 204 may be made of a flexible material, such as wire, flexible plastic, etc. to enable the loops 202, 204 to be expanded or contracted.

Figure 3A:
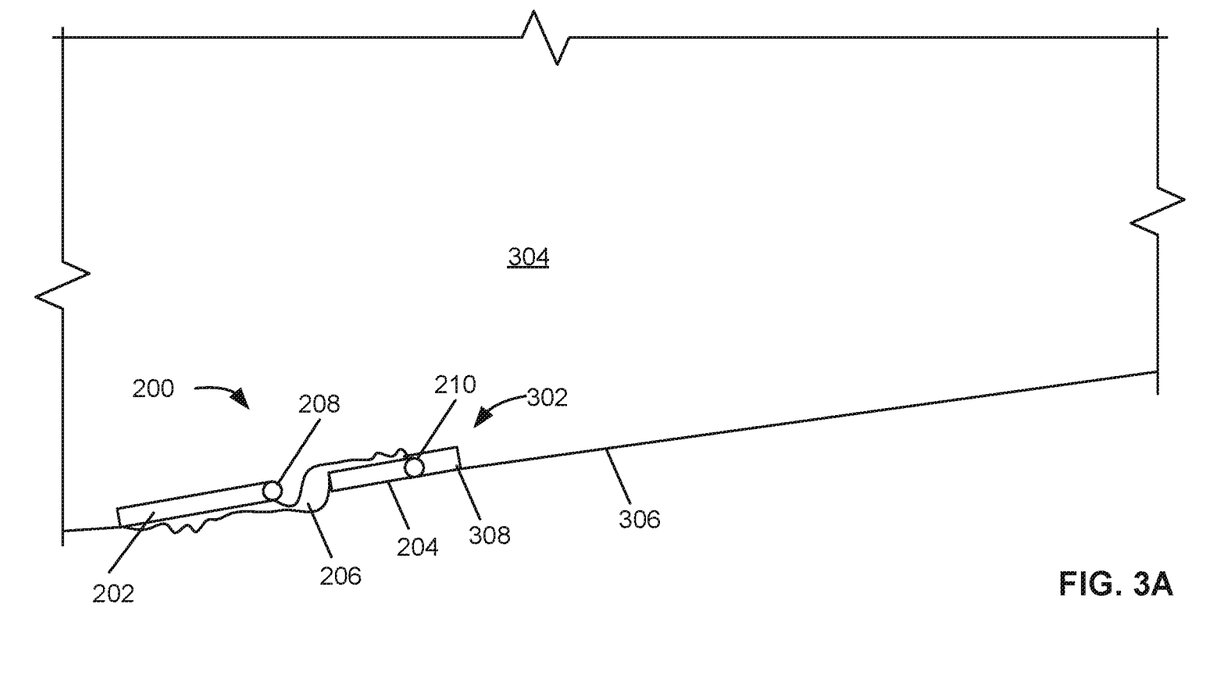
FIGS. 3A-3D depict a deployment and use of the example apparatus described herein.

The example apparatus 200 also includes a first fastener 208 and a second fastener 210 coupled to the respective first and second loops 202, 204. The first fastener 208 (e.g., a pivot) may be operative to pivot or rotate the first loop between a storage position within a storage area (e.g., storage area 302 of FIG. 3) and a deployed position. The second fastener 210 may be optative to rotate and/or translate to move the second loop 204 between a storage position within the storage area 302 and a deployed position. In some examples, the first and second fasteners 208, 210 may be operative to lock the respective first and second loops 202, 204 in the storage area 302. In such examples, upon unlocking, the first and second fasteners 208, 210 enable the first and second loops 202, 204 to deploy. The first and second loops 202, 204 may pivot or rotate at different rates due to the difference in size of the first and second loops 202, 204. For example, as the first loop 202 rotates, the second loop 204 rotates at a different speed such that the fluid flow channel 206 is properly deployed. In some examples, the rotation or pivoting of the first and second loops 202, 204 is controlled. Alternatively, the first loop 202 and/or the second loop 204 are able to rotate freely and, thus, rotate or pivot at a rate that is based on the velocity of the fluid flow through the fluid flow channel 206.

The fluid flow channel 206 may be made of a flexible, durable fabric, such as silk, nylon, synthetic fabric, etc. A first end 212 of the fluid flow channel 206 is coupled to the first loop 202 and a second end 214 of the fluid flow channel 206 is coupled to the second loop 204. As the first and second loops 202, 204 are deployed, the fluid flow channel 206 is formed. The fluid flow channel 206 is shaped to direct fluid flow (e.g., air flow) to, for example, an emergency power generator. In some examples, the fluid flow may be directed to an interior of the aircraft 100 to provide additional air to one or more of the aircraft systems (e.g., an air compressor). In examples in which the first and second loops 202, 204 are adjustable, the first and second ends 212, 214 may include elastic to enable the material forming the fluid flow channel 206 to grow and contract along with the first and second loops 202, 204.

The example apparatus 200 may also include tension lines 216 attached to the first loop 202. The tension lines 216 may be made of the same material as the fluid flow channel 206 so that the tension lines 216 are lightweight, durable and flexible. The tension lines 216 may be designed and/or sized such that, when the fluid flow channel 206 is deployed, the first loop 202, and thus the second loop 204, are not rotated more than 90 degrees from an initial position and/or from the aircraft 100. The tension lines 216 enable the fluid flow channel 206 to maintain a position to direct fluid flow to a designated area (e.g., an emergency power generator). In some examples, the tension lines 216 may be made of a different flexible and durable material.

FIGS. 3A-3D depict a deployment and use of the example apparatus 200 described herein. In FIG. 3A, the apparatus 200 is in a storage position within the aircraft 100. The apparatus 200 may be stored in a storage area 302 in a substantially flat orientation. The storage area 302 may be a portion of an interior 304 of the aircraft 100 (e.g., a cabin, a cargo area, a mechanical compartment, etc.) or may be a separate area disposed adjacent to a surface of the aircraft 100. In examples in which the apparatus 200 is implemented with the example airplane 100, the storage area 302 may be located adjacent to a surface 306 of the aircraft 100, such as a surface of the wing 112, a surface of the fuselage 114, a surface of the tail section 102, etc.

Figure 3B:
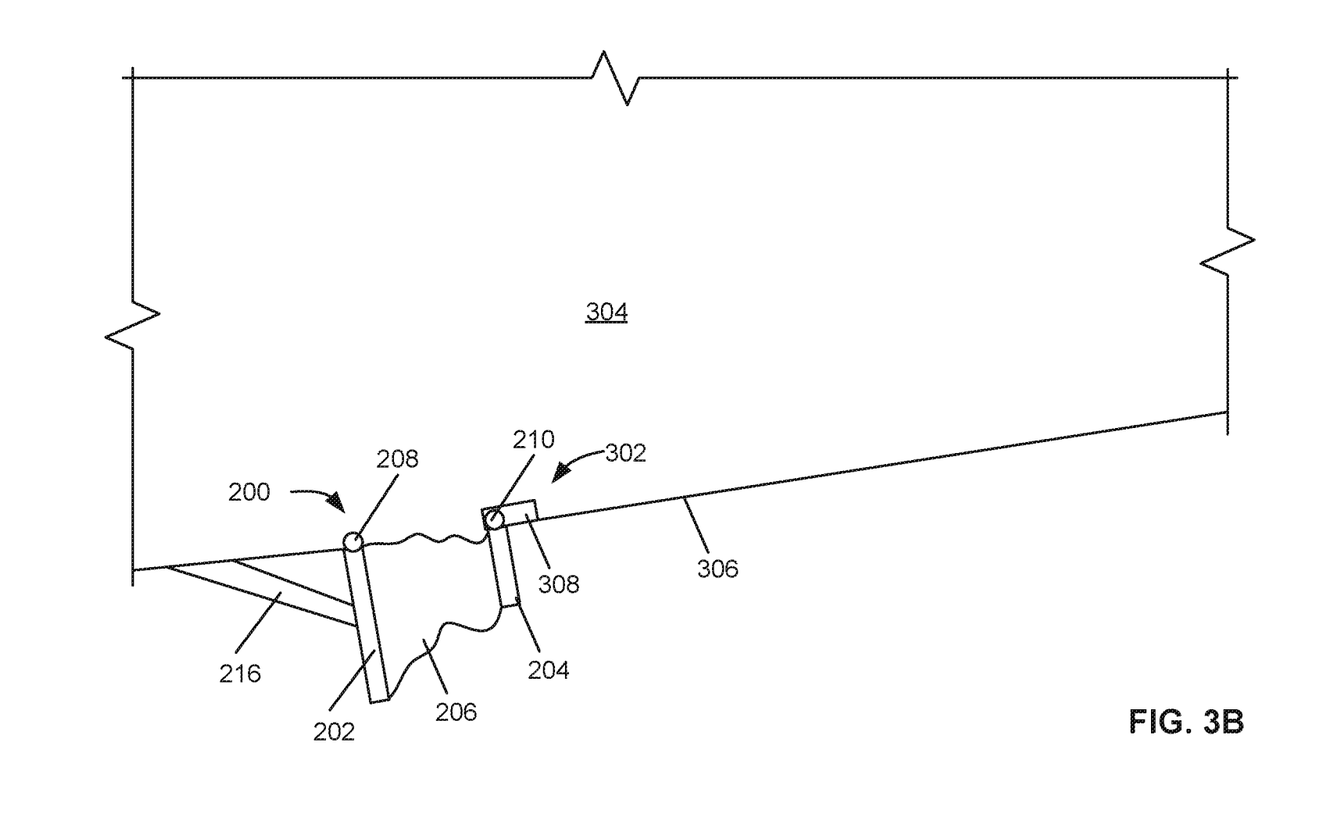

In FIG. 3B, the first loop 202 has been rotated from the storage position to a deployed position. The second loop 204 has rotated from the storage position and is in a partially deployed position. The second loop moves along the track 308 to a fully deployed position based on a fluid flow through the fluid flow channel 206. The fluid flow channel 206 (e.g., a nozzle) is formed when the second loop 204 has moved to the fully deployed position. The tension lines 216 are coupled to the first loop 202 to prevent the first loop 202 from rotating past the deployed position. Maintaining the first loop 202 in the deployed position prevents the second loop 204 from over-rotating and, thus, the fluid flow channel 206 stays in the deployed position.

Figure 3C:
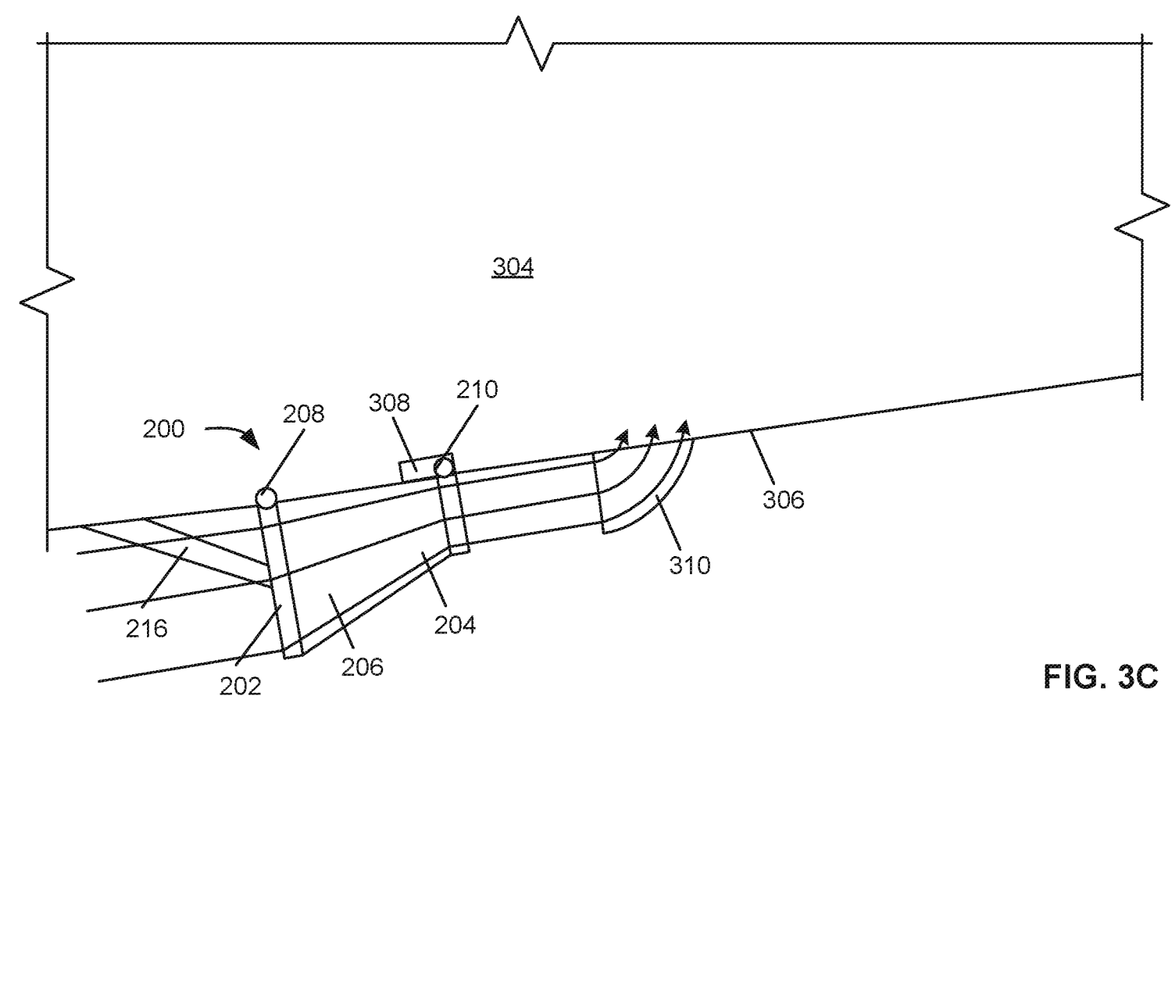
Figure 3D:
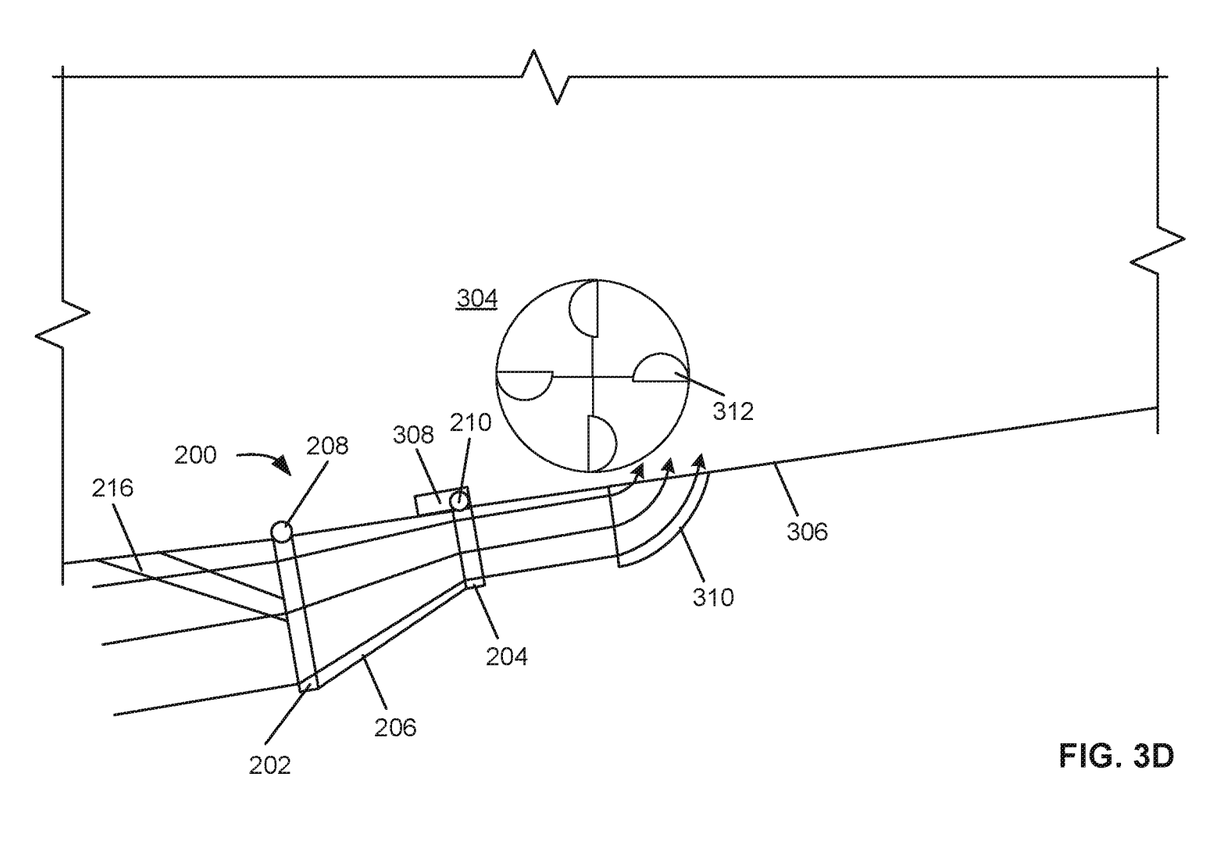

FIG. 3C depicts a fluid flow path that the fluid flow may take through the fluid flow channel 206. In this illustrated example, an additional flow control device 310 has been attached to the surface 306 of the aircraft 100 to direct the flow of the fluid into the interior 304 of the aircraft 100. As shown in FIG. 3D, the flow control device 310 may direct fluid flow to an emergency power generator 312 disposed within the interior 304 of the aircraft 100. In other examples, the flow control device 310 may not be included on the surface 306 of the aircraft 100 and the fluid flow channel 206 directs the flow of the fluid to an emergency power generator disposed external to the surface 306 of the aircraft 100.

Figure 4A:
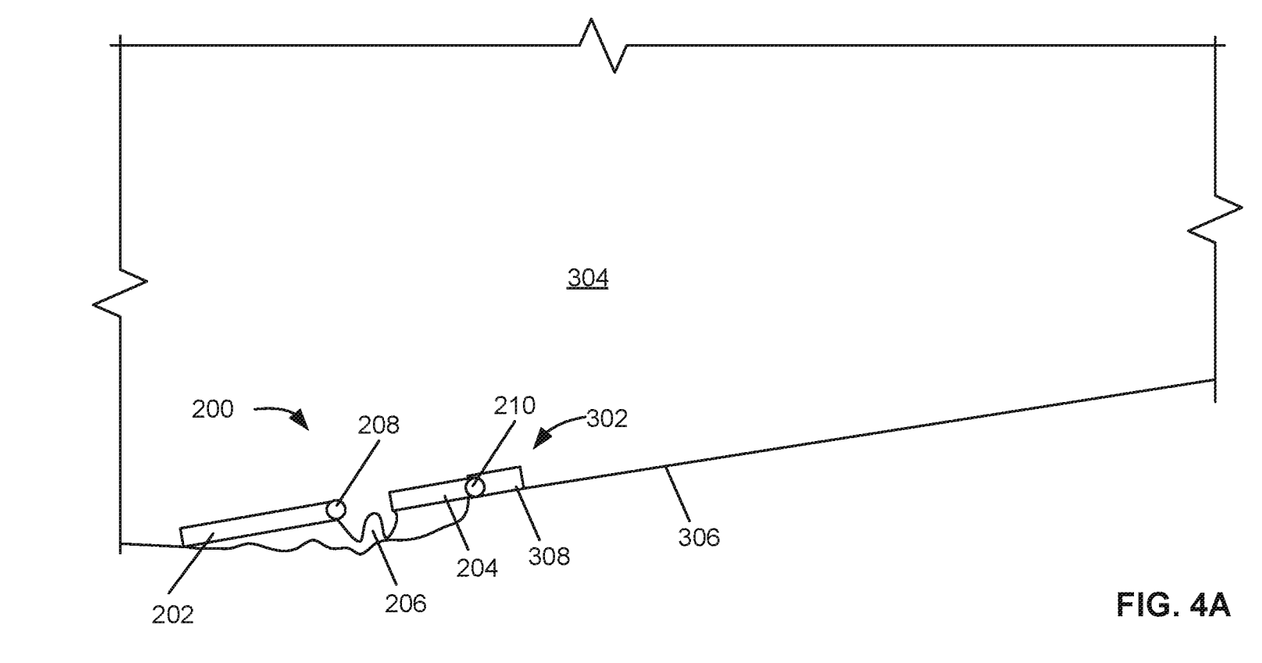
FIGS. 4A-4C depict an alternative deployment and use of the example apparatus described herein.
Figure 4B:
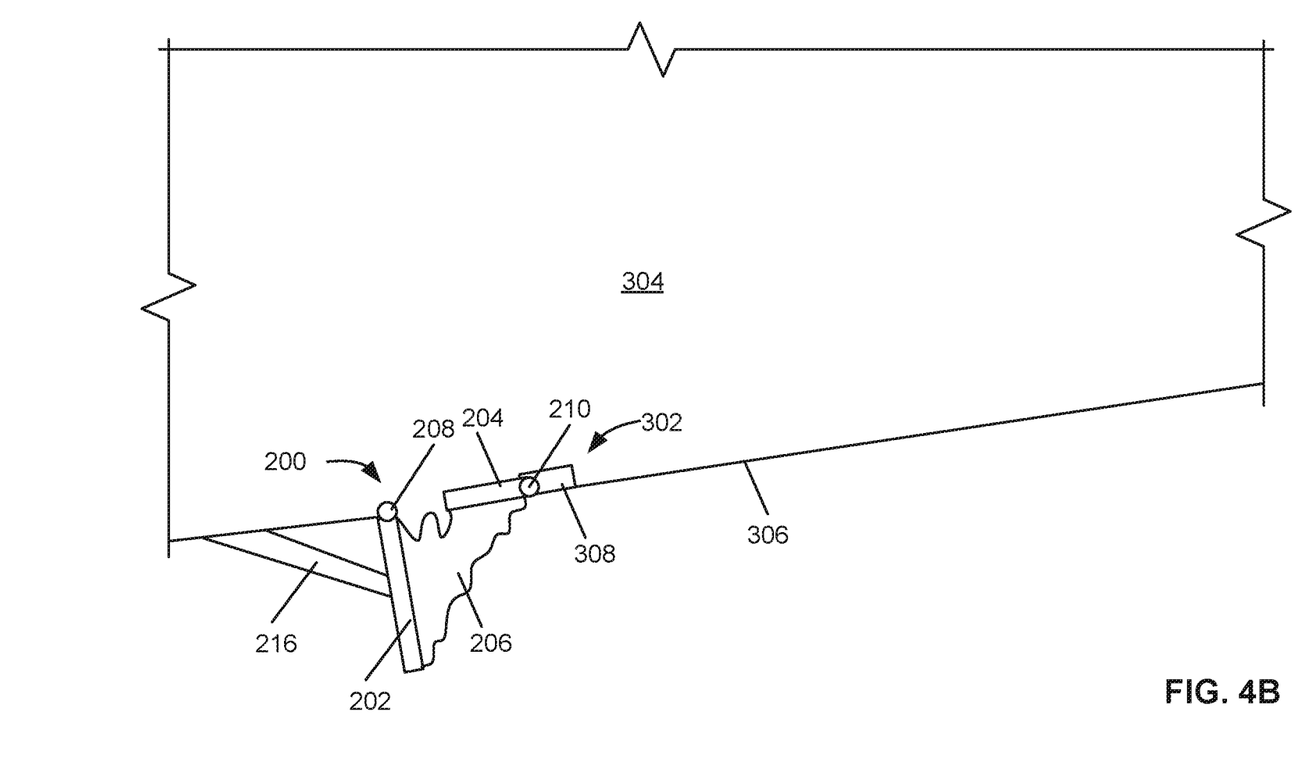
Figure 4C:
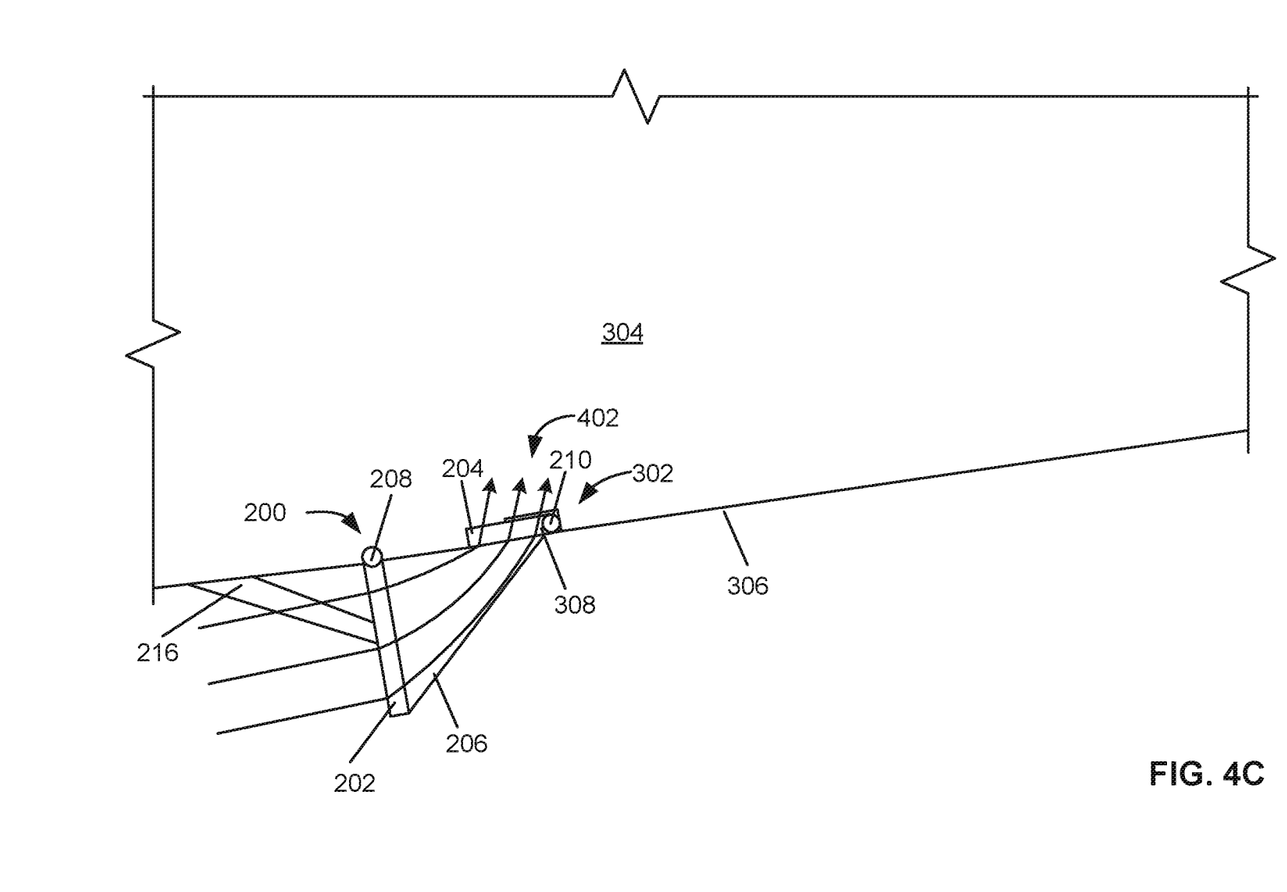

FIGS. 4A-4C depict an alternative deployment and use of the example apparatus 200 described herein. FIG. 4A depicts an alternative implementation of the example apparatus 200 in a storage position similar to that shown in FIG. 3A. FIG. 4B depicts the first loop 202 of the example apparatus 200 in a fully deployed position and the second loop 204 of the example apparatus 200 in a partially deployed position. The second loop 204 slides within the track 308 to move to a fully deployed position. Unlike the example implementation of the apparatus 200 in FIGS. 3A-3D, the second loop 204 in the alternative implementation of FIGS. 4A-4C does not rotate, but instead translates to direct fluid flow through an aperture 402 within the surface 306 of the aircraft 100.

FIG. 4C depicts a fluid flow path that fluid flowing through the fluid flow channel 206 may follow. In this illustrated example, the fluid flow channel 206 forces air directly into the interior 302 of the aircraft 100. In some examples, the fluid flow may be used to power the emergency power generator 312, as described in conjunction with FIG. 3D. Alternatively, the fluid flow channel 206 device may be operative to force fluid into a fluid compressor (e.g., a cabin air compressor) inlet. In such examples, the additional flow of fluid may facilitate maintenance of cabin pressure in the event of loss of power to the air compressor. In other examples, the flow of fluid into the interior 302 of the aircraft 100 may facilitate ventilation of smoke in a cockpit or cargo area of the example aircraft 100.

Figure 5:
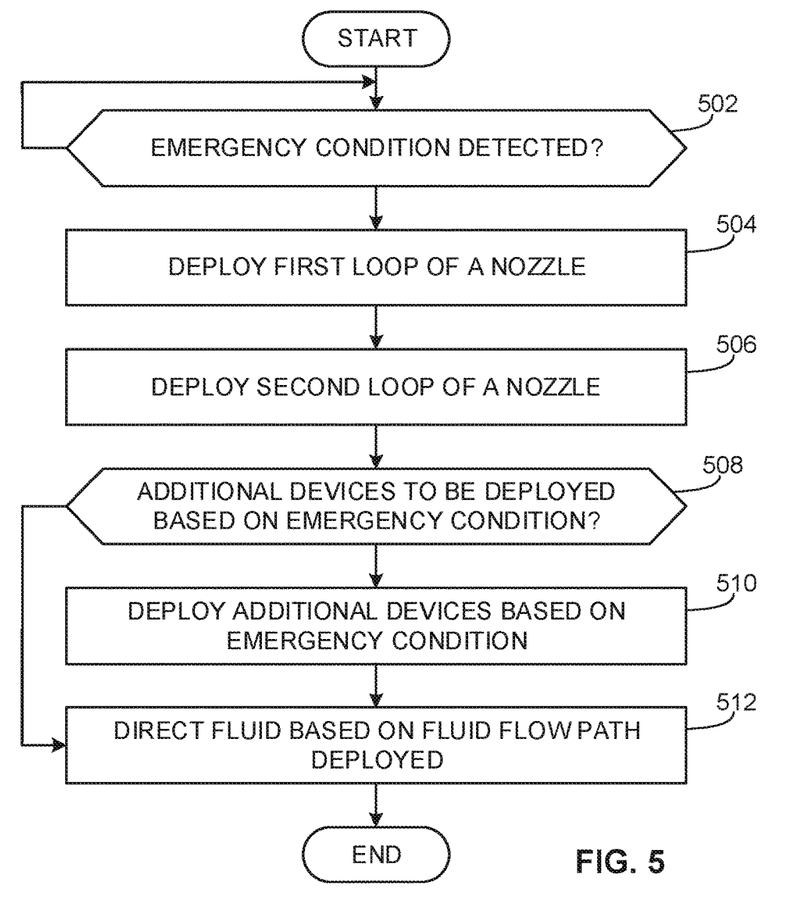
FIG. 5 is a flowchart depicting an example method of deploying the example apparatus.

FIG. 5 is a flowchart depicting an example method 500 of deploying the example apparatus 200. In some examples, the order of execution of the blocks may be changed, and/or some of the blocks described may be changed, eliminated, or combined. The method 500 begins when an emergency condition (e.g., loss of power to cabin air compressor, loss of engine power, smoke, etc.) is detected (block 502). The first loop 202 of the example apparatus 200 is deployed (block 504). The second loop 204 of the example apparatus 200 is also deployed, forming the fluid flow channel 206 (block 506). The method may include determining whether to deploy an additional device (e.g., an emergency power generator, the flow control device 310) based on the type of emergency condition detected (block 508). If an additional device is to be deployed based on the emergency condition, the addition device (e.g., an emergency power generator, the flow control device 310) is deployed (block 510). For example, if the emergency condition is a loops of engine power, the additional device deployed may include an emergency power generator. The fluid flow is directed through the fluid flow path that has been deployed (block 512) and the method 500 is complete.

From the foregoing, it will be appreciated that the above disclosed apparatus and articles of manufacture are operative to deploy a fluid flow channel to redirect fluid flow for emergency services on a vehicle.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
a first loop of flexible material pivotably coupled to an outside surface of an aircraft via a fastener, the first loop of flexible material pivotable between a storage position and a deployed position;
a second loop of flexible material coupled to the aircraft and disposed a distance from the first loop of flexible material; and
a fabric channel having a first end coupled to the first loop of flexible material and a second end coupled to the second loop of flexible material, the fabric channel to form a fluid flow channel between the first loop of flexible material and the second loop of flexible material when the first loop of flexible material is in the deployed position.

2. The apparatus as defined in claim 1, wherein the fluid flow channel is tapered to increase a velocity of a fluid flow between the first loop of flexible material and the second loop of flexible material.

3. The apparatus as defined in claim 1, wherein the first loop of flexible material defines a first area and the second loop of flexible material defines a second area, the first area larger than the second area.

4. The apparatus as defined in claim 1, wherein the second loop of flexible material is disposed in a track, the second loop of flexible material to translate within the track based on a flow of a fluid through the fluid flow channel.

5. The apparatus as defined in claim 1, wherein the second loop of flexible material is to fluidly couple the fluid flow channel to an interior of the aircraft.

6. The apparatus as defined in claim 1 further including a tension line extending from the aircraft to the first loop of flexible material, the tension line to prevent the first loop of flexible material from pivoting more than ninety degrees away from the aircraft.

7. The apparatus as defined in claim 1, wherein the fabric channel is constructed of nylon, silk, synthetic fibers, or any combination thereof.

8. The apparatus as defined in claim 1, wherein the fastener is a first fastener, further including a second fastener to couple the second loop of flexible material to the aircraft.

9. The apparatus as defined in claim 8, wherein the second loop of flexible material is pivotably coupled to the aircraft via the second fastener, and wherein the first loop of flexible material is pivotable at a first rate and the second loop of flexible material is pivotable at a second rate.

10. The apparatus as defined in claim 9, wherein the second rate is based on a velocity of a fluid through the fluid flow channel.

11. The apparatus as defined in claim 1, wherein the first loop of flexible material is deployable in response to a condition in which an emergency power generator is to be used.

12. The apparatus as defined in claim 11, wherein the first and second loops of flexible material are stored in an interior of the aircraft prior to being deployed.

13. A method comprising:
deploying a first loop of flexible material adjacent to a surface on an aircraft by rotating the first loop of flexible material from a storage position to a deployed position; and
deploying a second loop of flexible material adjacent to the surface on the aircraft, the second loop of flexible material to be deployed in a first position, wherein the second loop of flexible material is to move to a second position after deployment, and wherein a fabric channel is coupled between the first loop of flexible material and the second loop of flexible material.

14. The method as defined in claim 13, wherein the first loop of flexible material is pivotably coupled to the aircraft via a fastener.

15. The method as defined in claim 13, wherein the second loop of flexible material is moved from the first position to the second position based on a fluid flow through the second loop of flexible material.

16. The method as defined in claim 13, wherein, when the first and second loops of flexible material are deployed, a nozzle is formed by the fabric channel between the first and second loops of flexible material.

17. The method as defined in claim 16, wherein the nozzle is formed when the second loop of flexible material is in the second position.

* * * * *